F. W. HARRIS.
METHOD AND APPARATUS FOR DEHYDRATING PETROLEUM OILS.
APPLICATION FILED DEC. 27, 1916. RENEWED JUNE 28, 1921.
1,405,128.
Patented Jan. 31, 1922.
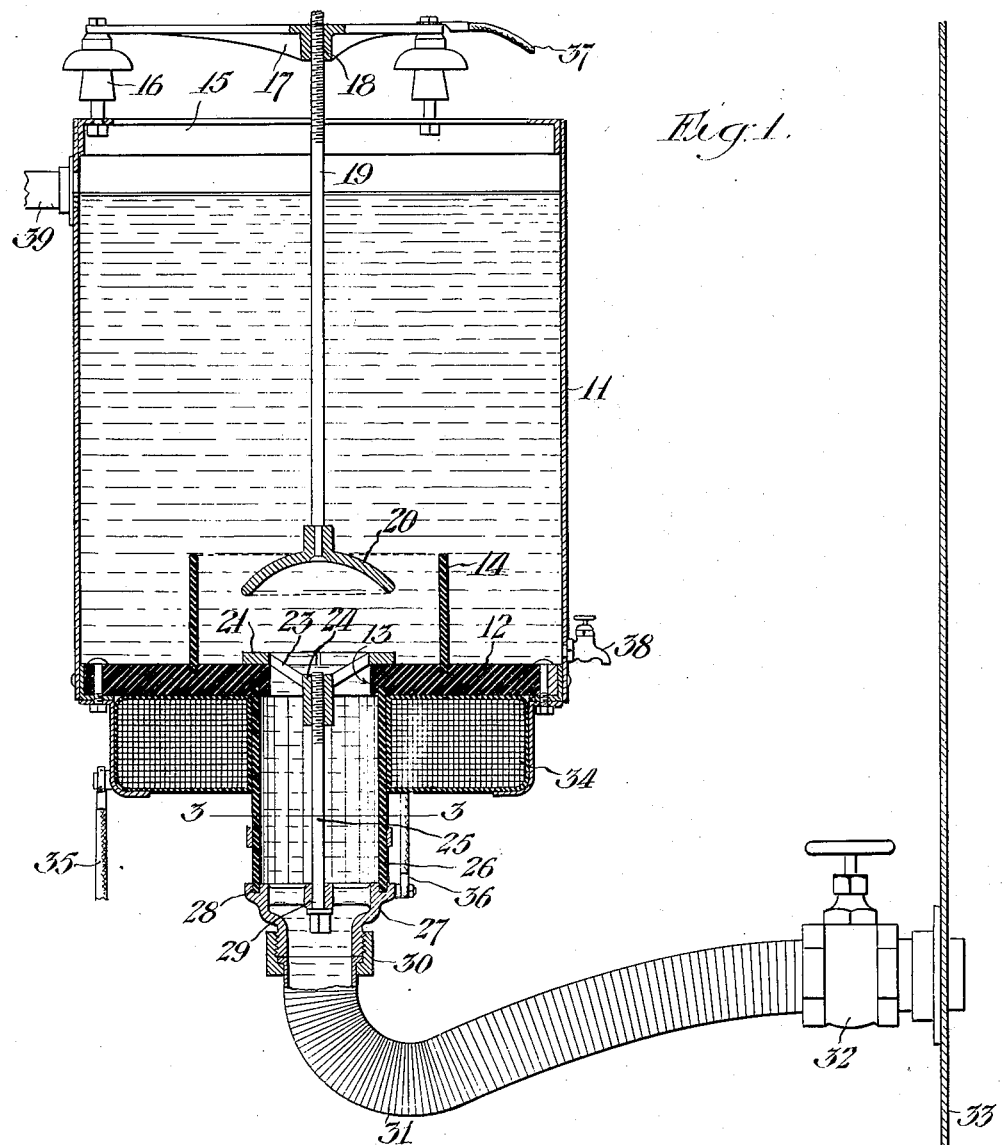
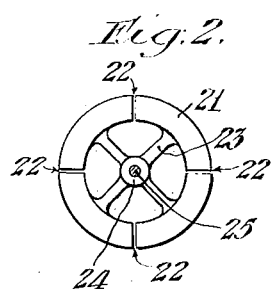
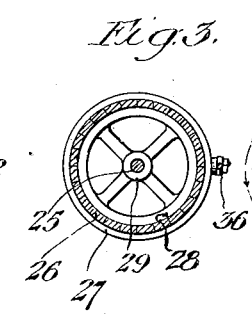
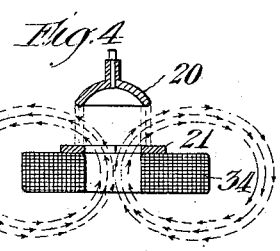

UNITED STATES PATENT OFFICE.

FORD W. HARRIS, OF LOS ANGELES, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

METHOD AND APPARATUS FOR DEHYDRATING PETROLEUM OILS.

1,405,128.      Specification of Letters Patent.      Patented Jan. 31, 1922.

Application filed December 27, 1916, Serial No. 139,222. Renewed June 28, 1921. Serial No. 481,170.

*To all whom it may concern:*

Be it known that I, FORD W. HARRIS, a citizen of the United States, residing at Los Angeles, in the county of Los Angeles and State of California, have invented a new and useful Method and Apparatus for Dehydrating Petroleum Oils, of which the following is a specification.

My invention relates to the art of dehydrating petroleums. Petroleum oils, as they occur in nature, are often associated with water in varying quantities, or water becomes mixed with the oil during its production or transportation. Water may be present in oil in two forms, first, as free water, and second, as trapped water. The free water is in large masses which readily settle out under favorable conditions, whereas the trapped water is in the form of an emulsion, consisting of very fine particles or globules which will not settle out even if the oil is allowed to stand for long periods.

The principal object of my invention is to provide means for converting the trapped water of the oil into free water. This I accomplish by passing an electric current through the body of oil. It is, however, old in the art to dehydrate oil by the use of electricity, suitable electrodes, between which electric currents pass, being immersed in the emulsion. Where electrodes are so immersed, the electric current tends to set up a definite path through a certain portion of the emulsion, and while the oil in this path and directly adjacent thereto is soon dehydrated, the remainder of the emulsion in the treating vessel, which may pass along a path not in direct contact with the current path, still contains a great deal of trapped water. Previous inventors have sought to overcome this difficulty, either by moving one or more of the electrodes, or by interrupting the current at stated intervals, so that free water has a chance to settle away and thus break down the current path.

My invention depends on a new principle in the art of dehydration, namely, the magnetic displacement of the current carrying path. In my invention, the currents flowing through the emulsion are formed in a magnetic field which is so arranged that the current path is constantly being forced around, thereby constantly contacting with fresh portions of the emulsions, so that the whole mass is rapidly dehydrated.

Further objects and advantages will be set forth more in detail hereinafter.

Referring to the drawings, which are for illustrative purposes only:

Figure 1 is a side elevation, partly in section, of my invention.

Fig. 2 is a top view of the lower electrode.

Fig. 3 is a section on a plane represented by the line 3—3 of Fig. 1, the flexible outlet pipe being omitted, and Fig. 4 is a diagram illustrating the electro-magnetic theory.

In these drawings, a tank 11 is provided, this tank having a bottom 12 formed of wood or other non-magnetic material in which a central hole 13 is cut. Supported on the bottom 12 is an intermediate cylindrical partition 14 which may also be of wood or other non-conducting material. Supported on an angle iron member 15, which is secured to the top of the tank 11, are a series of insulators 16 which carry a spider 17 having a centrally threaded hole 18 in which a stem 19 may be turned. Secured to the lower end of the stem 19 is an upper electrode 20, this electrode being of cup-shaped form, as shown in the drawings. Secured directly below the upper electrode 28, and concentric with the hole 13, is a lower electrode 21 which is split up by slots 22, as shown in Fig. 2, to prevent the formation of currents therein. A series of arms 23 connect with a central hub 24 in which a bolt 25 is threaded. Secured in the bottom 12 around the hole 13 is a tube 26, this tube being preferably formed of wood or other non-magnetic material. A bottom casting 27 has a seat 28 formed therein in which the tube 26 is seated, and has a central hub 29 through which the bolt 25 passes, this bolt 25 serving to clamp the tube 26 in place in water tight relationship with the bottom 12 and the casting 27. The lower portion of the bottom casting 27 is threaded to receive a nut 30 which clamps a flange on a flexible pipe 31 against the bottom casting 27. The flexible pipe 31 is connected through a valve 32 with the interior of a tank 33. Surrounding the tube 26 and in close relationship with the bottom 12 is a blow-out coil 34, this coil being provided with terminal wires 35 and 36, the wire 35 being connected to one side of an electric circuit, and the wire 36 being connected to the bottom casting 27. The other side of the electric circuit is connected through a wire 37 with the spider 17, and through the stem 19 with the upper electrode 20. A pet-cock 38 is provided near the bottom 12 in the side of the tank 11. A pipe 39 connects with the upper portion of the tank 11.

The method of operation of the invention is as follows:

Emulsion supplied to the tank 11 through the pipe 39 flows downwardly towards the opening 13. The intermediate partition 14 serves to prevent side currents and to direct the flow of emulsion to the space between the electrodes 20 and 21, and the annular space outside the partition 14 serves as a trap to collect free water which may be drawn off through the petcock 38. The electromotive force impressed is sufficient to establish a flow of current between the electrodes 20 and 21, this flow taking place through the water particles of the emulsion and tending to break them up and consolidate them into large masses. This current is, however, prevented from remaining in any one place by the action of the coil 34. This coil causes lines of electric force to pass through the current path approximately as shown in Fig. 4, the lines of force crossing the path of the current approximately at right angles thereto. There is therefore a homopolar action, the current path tending to rotate around the opening 13 between the electrodes 20 and 21. This rotation may be quite slow and yet be efficient, as its purpose is simply to prevent the continuous flow of current between any two points on the electrodes 20 and 21. The trapped water of the emulsion is therefore separated into large masses which pass, together with the free oil, downwardly through the tube 26 and through the pipe 31 into the tank 33 where the water is allowed to settle out from the oil. The bottom 12 and the tube 26 are preferably made of wood or other non-magnetic and non-conducting material for the purpose of preventing the formation of large eddy currents which would otherwise be introduced therein when an alternating current is impressed on the coil 34.

While my invention is primarily intended for use on alternating circuits, as they are commercially the most convenient, either direct or alternating currents may be used.

I attach particular importance to the fact that in my invention I use an electric current having a perpendicular path, as this allows for a wider separation of the electrodes and a more positive action in the emulsion.

In the various types of electric treaters for dehydrating oils which have been previously designed, it has been common practice to cause the arcs to occur either horizontally or vertically, and to cause the material treated to flow through the arc path in a substantially vertical direction, either upwardly or downwardly. In the present invention, the arc is more or less perpendicular or vertical, and the direction of flow is approximately at right angles to the arc, or horizontal. The terms "perpendicular" and "vertical" are to be taken as approximately only; as the arc is distorted more or less from true vertical or true horizontal position.

I claim as my invention:—

1. A process of dehydrating petroleum emulsions which comprises causing a current to flow through the body of the emulsion between electrodes immersed in the emulsion, and simultaneously subjecting the current path so formed to the action of a magnetic field so placed as to cause said path to move through the emulsion.

2. A process as in claim 1 in which the electrodes are so shaped and the magnetic field is so directed that said current path moves in closed plane terminating at either electrode.

3. An apparatus for dehydrating emulsions comprising a pair of ring electrodes immersed in the emulsion; means for causing an electric current to flow over a path in the emulsion between said electrodes; and means for producing a magnetic field so placed as to cause said path to circulate around said ring electrodes.

In testimony whereof, I have hereunto set my hand at Los Angeles, California, this 20th day of December, 1916.

FORD W. HARRIS.